(12) United States Patent
Peres et al.

(10) Patent No.: US 6,618,703 B1
(45) Date of Patent: Sep. 9, 2003

(54) INTERFACE TO A SPEECH PROCESSING SYSTEM

(75) Inventors: Renana Peres, Givatayim (IL); Guy Shimoni, Rishon Lezion (IL)

(73) Assignee: Persay Inc., Wilmington, DE (US)

( * ) Notice: Subject to any disclaimer, the term of this patent is extended or adjusted under 35 U.S.C. 154(b) by 0 days.

(21) Appl. No.: 09/426,904

(22) Filed: Oct. 26, 1999

(51) Int. Cl.[7] .............................................. G10L 15/00
(52) U.S. Cl. ..................... 704/270; 704/246; 379/88.01
(58) Field of Search ................... 704/270, 275, 704/246, 273; 379/88.02, 88.01, 88.03

(56) References Cited

U.S. PATENT DOCUMENTS

| | | | | |
|---|---|---|---|---|
| 5,127,043 A | * | 6/1992 | Hunt et al. ............... | 379/88.02 |
| 5,297,194 A | * | 3/1994 | Hunt et al. ............... | 379/88.02 |
| 5,465,290 A | * | 11/1995 | Hampton et al. ......... | 379/88.02 |
| 5,502,759 A | * | 3/1996 | Cheng et al. .................. | 379/88 |
| 5,703,940 A | * | 12/1997 | Sattar et al. ................. | 379/201 |
| 5,875,234 A | * | 2/1999 | Clayton et al. .......... | 379/93.05 |
| 5,915,001 A | * | 6/1999 | Uppaluru ................. | 379/88.22 |
| 6,044,347 A | * | 3/2000 | Abella et al. ................ | 704/272 |
| 6,073,192 A | * | 6/2000 | Clapp et al. ................... | 710/65 |
| 6,112,176 A | * | 8/2000 | Goldenthal et al. | |
| 6,154,526 A | * | 11/2000 | Dahlke et al. ........... | 379/88.03 |
| 6,163,535 A | * | 12/2000 | Jordan et al. ................ | 370/352 |
| 6,278,772 B1 | * | 8/2001 | Bowater et al. ......... | 379/88.13 |
| 6,363,349 B1 | * | 3/2002 | Urs et al. .................... | 704/275 |

OTHER PUBLICATIONS

"Advanced Identification Services C API", IBM Corporation, http://www.hursley.ibm.com/~innovate/ais.htm.
"Biometric Application Programming Interface (BAPI)", http://www.iosoftware.com/bapi/.

* cited by examiner

*Primary Examiner*—Daniel Abebe
(74) *Attorney, Agent, or Firm*—Eitan, Pearl, Latzer & Cohen Zedek, LLP

(57) ABSTRACT

An application programming interface (API) for enabling, a calling application to instruct a speech processing system to perform operations including online audio acquisition and algorithmic speech processing operations includes acquisition interface means for enabling the calling application to instruct the speech processing system to acquire online audio from an external communication channel, and processing interface means for enabling the calling application to instruct the speech processing system to perform at least one of the algorithmic speech processing operations on said acquired audio. The acquisition interface means and the processing interface means include object-oriented classes. The external communication channel is selected from a group including a particular time slot of a telephone trunk, a particular telephone extension and an audio file of a remote audio storage.

6 Claims, 6 Drawing Sheets

¹

INTERFACE TO A SPEECH PROCESSING SYSTEM

FIELD OF THE INVENTION

The present invention relates to speech processing in general and to an application programming interface (API) to a speech processing system in a telephony environment in particular.

GLOSSARY

API—Application Programming Interface

Calibration—A preliminary algorithmic process which is occasionally required in order to calibrate the speech processing system and which is usually performed before any training is done. This is occasionally required for the correct operation of the system, and is usually performed once, at installation.

Calibration Formula (CF)—The outcome of the calibration process. In some cases, a calibration formula is needed as an input to the next phases of the speech processing processes.

Calibration Set (CS)—The input to the calibration process.

Calling Application—An application that uses the API in order to receive speech processing services from the speech processing system.

Persistent Object—Data used during the speech processing which needs to be stored, either internally or externally. For example, in the case of speaker verification, the persistent objects include the calibration set, the calibration formula, the voice signatures and the verification formulas.

Speech Processing—Any algorithmic processing on spoken data, including, but not limited to, speaker verification, speaker recognition, word recognition, speech compression and silence removal.

Telephony Environment—An environment in which conversations pass through a telephony medium, for example E1/T1 trunks, modems and analog telephone extensions, and including a network environment, for example, the Internet.

Training—The algorithmic process of learning from specific data in order to perform a particular task. In the case of speaker verification, the input to training is a collection of the speaker's audio segments known as the speaker's voice signature (VS). In the case of word recognition, the input to training is a "word signature".

Verification Formula (VF)—The output of the training in the case of speaker verification. The verification formula is used in the algorithmic process of speaker verification.

BACKGROUND OF THE INVENTION

Speech processing technologies are known in the art. Speech processing products are available, for example, from Nuance Communications of Menlo Park, Calif., USA and Lernout & Hauspie Speech Products N.V. of Belgium.

Generally, systems providing speech processing services are integrated into other applications, and therefore there is a need for an interface between a speech processing system 100 and a calling application 102, both shown in FIG. 1, to which reference is now made. The designers of calling application 102 use an application programming interface (API) 104 so that calling application 102 may receive services from speech processing system 100. If API 104 is well designed and is adopted by many different vendors of speech processing systems, then the designer of calling application 102 can change from one speech processing system to another without having to change calling application 102.

I/O Software, Inc. of Riverside, Calif. USA, has produced a biometric API (BAPI) for communication between software applications and biometric devices such as fingerprint scanners and smart cards encoded with fingerprint biometric information.

The Human Authentication API (HA-API) project is an initiative of the US Government's Department of Defense through the Biometric Consortium. The HA-API specification was prepared by National Registry Inc. of Tampa, Fla., USA.

The Speech Recognition API Committee created a speaker verification API (SVAPI). SVAPI enables the calling application to verify a claimed identity only after the speaker has finished speaking. There are a number of situations that SVAPI is unable to support. For example, it does not support online verification, i.e. verification that is performed while the speaker is speaking.

In a further example, SVAPI does not contain commands for handling the data that is required for training and verification, e.g. the voice signatures and the verification formulas. Rather, SVAPI assumes that the calling application is responsible for handling this data.

In another example, SVAPI does not allow the calling application to set policies relating to the speaker verification, such as the frequency of verification updates, the length of audio for verification and decision policies.

IBM Corporation of Armonk, N.Y. USA has produced the "Advanced Identification Services C API". It is intended to be more specific and detailed than HA-API, but more general than SVAPI.

SUMMARY OF THE INVENTION

There is provided in accordance with a preferred embodiment of the present invention an application programming interface (API) for enabling a calling application to instruct a speech processing system to perform operations including online audio acquisition and algorithmic speech processing operations. The API includes acquisition interface means for enabling the calling application to instruct the speech processing system to acquire online audio from an external communication channel, and processing interface means for enabling the calling application to instruct the speech processing system to perform at least one of the algorithmic speech processing operations on said acquired audio.

According to another aspect of the present invention, the acquisition interface means and the processing interface means include object-oriented classes.

According to another aspect of the present invention, the external communication channel is selected from a group including a particular time slot of a telephone trunk, a particular telephone extension and an audio file of a remote audio storage.

According to another aspect of the present invention, the API further includes provision interface means for enabling the calling application to directly provide the speech processing system with provided audio.

According to another aspect of the present invention, the provision interface means include object-oriented classes.

According to another aspect of the present invention, the provided audio is any of a microphone recording and voice over Internet (VO/IP) data.

According to another aspect of the present invention, the processing interface means also enables the calling application to instruct the speech processing system to perform at least one of the algorithmic speech processing operations on any of the acquired audio, the provided audio and the combination thereof.

According to another aspect of the present invention, the processing interface means includes interface means for enabling the calling application to instruct, during acquisition of the acquired audio, the speech processing system to commence at least one of the algorithmic speech processing operations on the acquired audio.

According to another aspect of the present invention, the processing interface means include interface means for enabling the calling application to instruct the speech processing system to perform at least one of the algorithmic speech processing operations throughout a conversation with a speaker whose audio samples are contained in the acquired audio.

According to another aspect of the present invention, the speech processing system is capable of performing data management operations including creating, storing and retrieving data objects. The API further includes management interface means for enabling the calling application to instruct the speech processing system to perform at least one of the data management operations.

According to another aspect of the present invention, the management interface means include object-oriented classes.

According to another aspect of the present invention, the speech processing system has an internal data store and the management interface means include interface means for enabling the calling application to instruct the speech processing system to store data in the internal data store and to retrieve the data from the internal data store.

According to another aspect of the present invention, the calling application has access to an external data store and the management interface means includes interface means for enabling the calling application to instruct the speech processing system to store data in the external data store and to retrieve the data from the external data store.

According to another aspect of the present invention, the speech processing system has an internal data store, the calling application has access to an external data store and the API further includes at least one parameter for each run-time instance of one of the object-oriented classes, the parameter settable by the calling application, which determines whether the instance is stored in the internal data store or in the external data store.

According to another aspect of the present invention, the speech processing system is capable of performing calibration operations and the API further includes calibration interface means for enabling the calling application to instruct the speech processing system to perform at least one of the calibration operations.

According to another aspect of the present invention, the calibration interface means includes object-oriented classes.

According to another aspect of the present invention, the API further includes at least one parameter, settable by the calling application, which determines whether the calibration operations are performed automatically when there is enough input to the calibration operations.

According to another aspect of the present invention, the speech processing system has parameters that control its operation and the API further includes a mechanism for setting and retrieving the parameters at run-time.

There is also provided in accordance with a preferred embodiment of the present invention, an application programming interface (API) for enabling a calling application to instruct a speaker verification system to perform operations including online audio acquisition and verification. The API includes acquisition interface means for enabling the calling application to instruct the speaker verification system to acquire online audio from an external communication channel, and verification interface means for enabling the calling application to instruct the speaker verification system to verify the acquired audio.

According to another aspect of the present invention, the acquisition interface means and the verification interface means include object-oriented classes.

There is also provided in accordance with a preferred embodiment of the present invention a method of providing an application programming interface (API) for enabling a calling application to instruct a speech processing system to perform operations including online audio acquisition and algorithmic speech processing operations. The method includes the steps of providing acquisition interface means for enabling the calling application to instruct the speech processing system to acquire online audio from an external communication channel, and providing processing interface means for enabling the calling application to instruct the speech processing system to perform at least one of the algorithmic speech processing operations on the acquired audio.

According to another aspect of the present invention, the acquisition interface means and the processing interface comprise object-oriented classes.

There is also provided in accordance with a preferred embodiment of the present invention a method of providing an application programming interface (API) for enabling a calling application to instruct a speaker verification system to perform operations including online audio acquisition and verification. The method includes the steps of providing acquisition interface means for enabling the calling application to instruct the speaker verification system to acquire online audio from an external communication channel, and providing processing interface means for enabling the calling application to instruct the speaker verification system to verify said acquired audio.

According to another aspect of the present invention, the acquisition interface means and the processing interface means include object-oriented classes.

There is also provided in accordance with a preferred embodiment of the present invention a method of interfacing to a speech processing system capable of performing operations including online audio acquisition and algorithmic speech processing operations. The method includes the steps of instructing the speech processing system to acquire online audio from an external communication channel, and instructing the speech processing system to perform at least one of the algorithmic speech processing operations on the acquired audio.

There is also provided in accordance with a preferred embodiment of the present invention a method of interfacing to a speaker verification system capable of performing operations including online audio acquisition and verification. The method includes the steps of instructing the speaker verification system to acquire online audio from an external communication channel, and instructing the speech processing system to verify the acquired audio.

BRIEF DESCRIPTION OF THE DRAWINGS AND APPENDICES

The present invention will be understood and appreciated more fully from the following detailed description taken in conjunction with the appended drawings and appendices in which.

Appendix A is a summary of the data types of the API, according to a preferred embodiment of the present invention;

Appendix B is a specification of the objects of the API, according to a preferred embodiment of the present invention;

Appendix C is a summary of the object parameters, according to a preferred embodiment of the present invention; and Appendix D is a table of error return codes of the API methods, according to a preferred embodiment of the present invention.

DETAILED DESCRIPTION OF THE PRESENT INVENTION

The present invention is directed towards an object-oriented application programming interface (API) to a speech processing system in a telephony environment. In the description, the specific example of a speaker verification system is given. However, it will be appreciated by persons skilled in the art that the API may easily be extended or modified to support various speech processing tasks, including but not limited to, speaker recognition, word recognition, speech compression and silence removal.

1. GENERAL DESCRIPTION OF THE API

The API enables the following operational tasks:

a) Audio acquisition;

b) Algorithmic speech processing (e.g. training), some of which are online operations (e.g. verification);

c) Calibration;

d) Data management of persistent objects to be used in the algorithmic processes;

e) Control of system parameters in a dynamic fashion and at varying levels of control.

Figure 1:
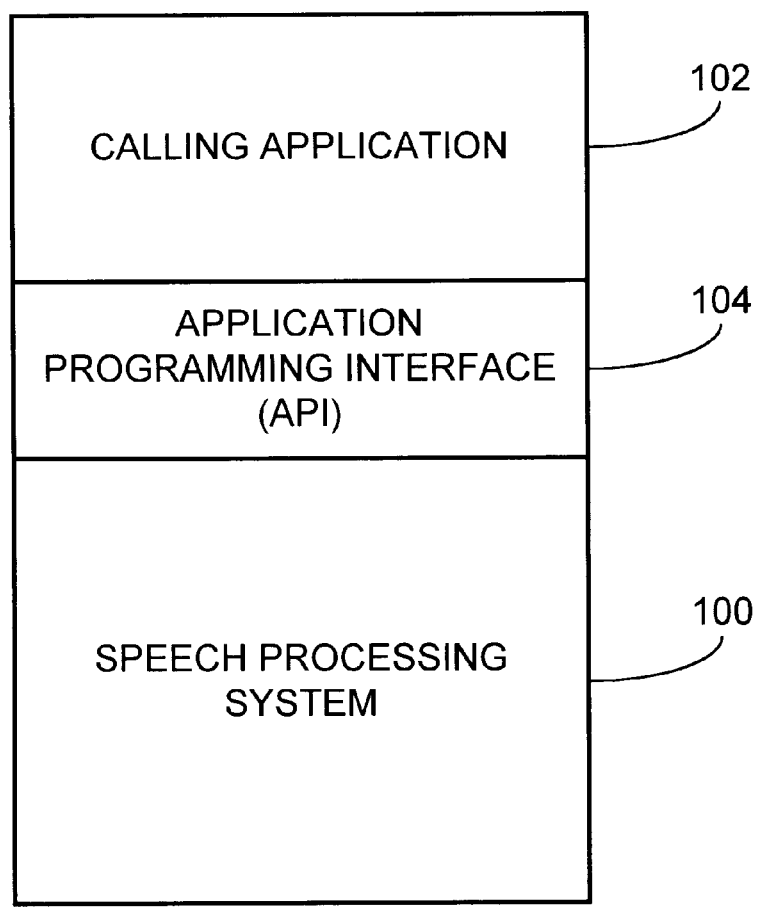
FIG. 1 is a schematic illustration of a calling application interacting with a speech processing system via an application programming interface (API), as is known in the art.
Figure 2:
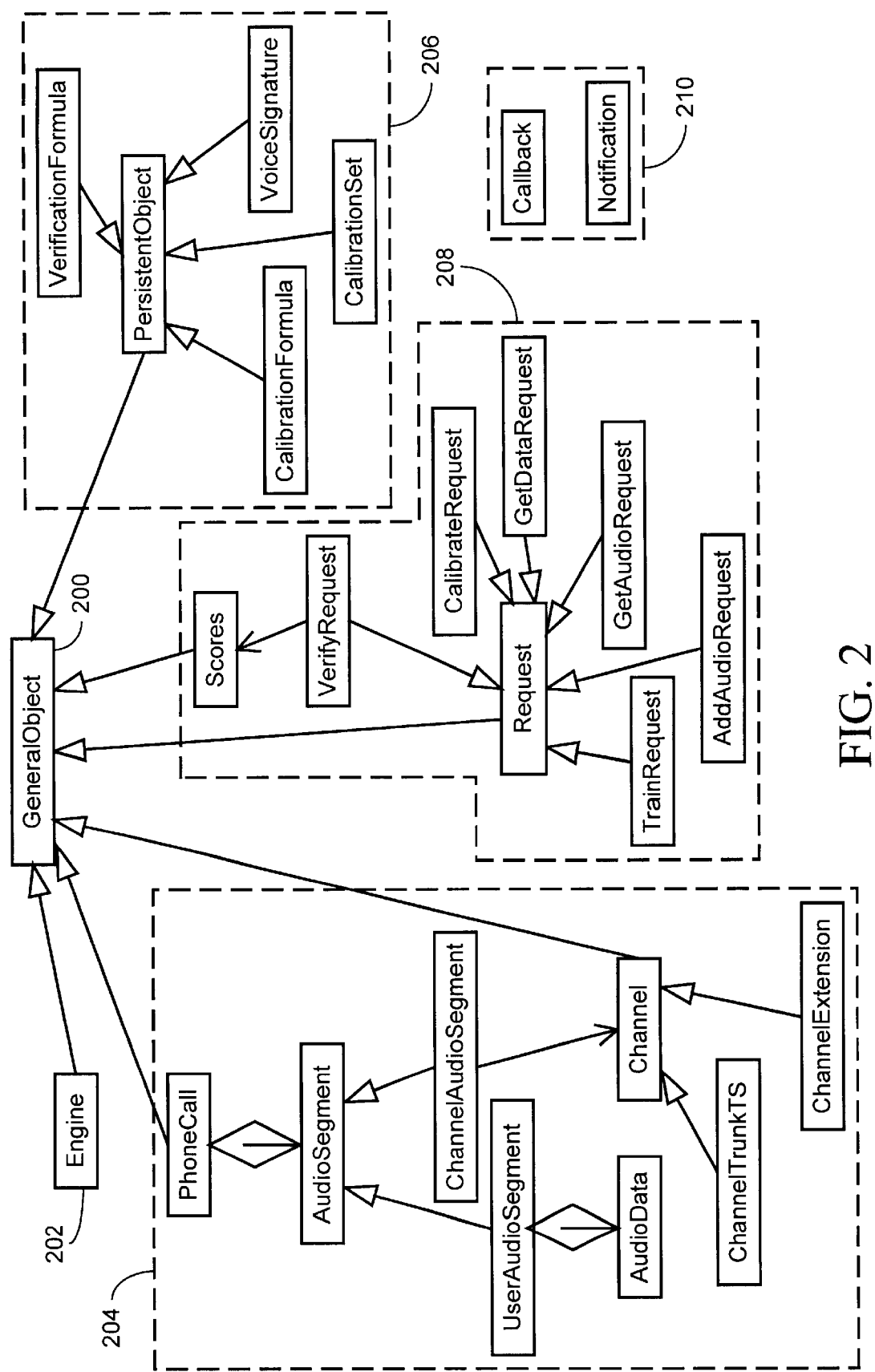
FIG. 2 is a diagram of the classes of the application programming interface (API), according to a preferred embodiment of the present invention.

Reference is now made to FIG. 2, which is a diagram of the classes of the application programming interface (API), according to a preferred embodiment of the present invention. Classes 200 and 202 and the classes in the sets 204, 206 and 208 should be implemented by the speech processing system. The classes in the set 210 should be implemented by the calling application.

The GeneralObject class 200 and the Engine class 202 will be described in more detail hereinbelow with respect to FIG. 3. The classes in the set 204 are related to audio acquisition and will be described in more detail hereinbelow with respect to FIG. 4. The classes in the set 206 are related to data management and will be described in more detail hereinbelow with respect to FIG. 5. The classes in the set 208 are related to asynchronous operations and will be described in more detail hereinbelow with respect to FIG. 6

Throughout FIGS. 2, 3, 4, 5 and 6, arrows with full closed heads represent inheritance of a derived class from its parent class, arrows with open heads represent a one-to-one association of objects of those classes, and diamond symbols represent aggregation, i.e. a one-to-many association of objects of those classes.

1.1. Audio Acquisition

Figure 4:
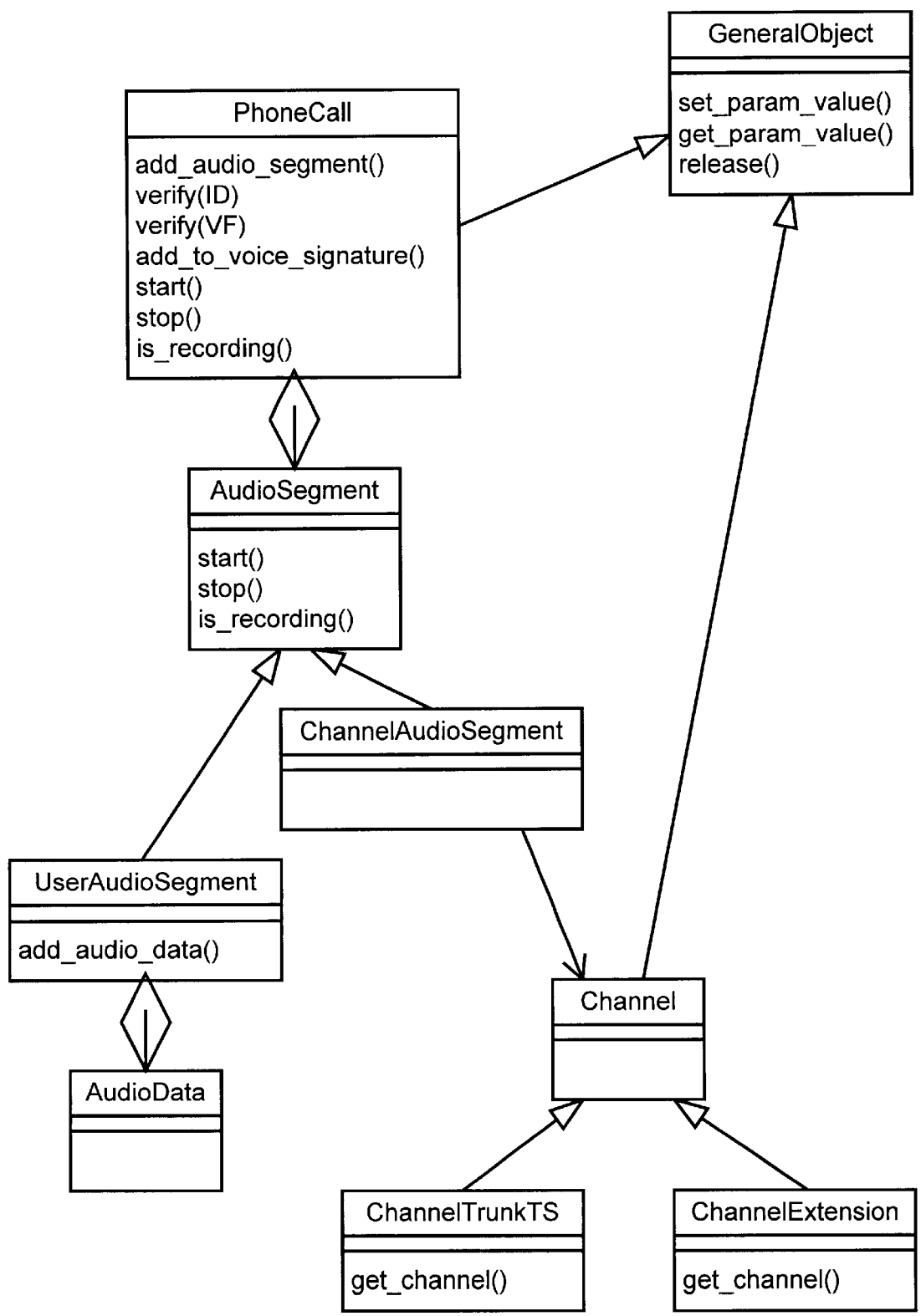

The API's PhoneCall object, which will be described in further detail hereinbelow with respect to FIG. 4, is the logical element of audio. The audio contained in the PhoneCall object is used for all of the algorithmic speech processing. In the case of speaker verification, for example, the PhoneCall object's audio is used for building voice signatures, for constructing calibration sets and for verification.

The API enables online audio acquisition from an external communication channel, for example from a particular time slot of a telephone trunk, from a particular telephone extension, or from an audio file of a remote audio storage. The API also enables audio acquisition from audio provided directly by the calling application. Examples of audio provided directly by the calling application include audio recorded through a microphone and voice over Internet (VO/IP) data.

It is common that the calling application needs to do audio acquisition from a particular time slot of a telephone trunk, and therefore the API provides a simplified mechanism for doing so. The API also provides a more complex yet flexible mechanism for audio acquisition that gives the calling application full control over the audio acquisition. As will be explained in further detail hereinbelow with respect to FIG. 4, this full control mechanism is easily extendible or modifiable to future modes of audio acquisition.

Each PhoneCall object may contain audio acquired using either of these mechanisms or even audio acquired through a combination of these mechanisms. Therefore, the API enables the calling application to perform algorithmic speech processing on audio acquired from a variety of sources. This is useful, for example, in the case that a speaker contacts the calling application via the Internet and begins a conversation, whose audio is acquired as VO/IP data, and then during the conversation, the speaker is transferred to a regular telephone line and the conversation continues. Processing may be performed on the entirety of the conversation, and is therefore based upon all the available audio, rather than just a part of it.

1.2. Algorithmic Speech Processing

One of the features of the API is that audio acquisition operations are separated from the algorithmic processing. Thus the calling application can decide during the audio acquisition which operations it wishes to perform on the acquired audio. For example, it is possible to start acquiring audio from a conversation with a speaker and to decide later in the conversation to verify a claimed identity of the speaker using all of the audio acquired during the present conversation. In another example, it is possible to start acquiring audio from a conversation with a speaker and to decide later in the conversation to add it to a calibration set or to the speaker's voice signature. The separation of audio acquisition from algorithmic processing also enables the calling application to perform algorithmic processes throughout a conversation with a speaker, with updated processing results reported at regular time intervals.

The API enables the calling application to determine processing policies through the run-time setting of object parameters. For example, in the case of recognition, the policies include the frequency of recognition updates, the length of audio for recognition and the decision policies.

1.3. Calibration

The API enables the calling application to add acquired audio to a calibration set and to calibrate the speech processing system using the calibration set. There may be more than one calibration set. Through the setting of a CalibrationSet object parameter, the API enables the calling application to determine whether calibration will be performed automatically when there is enough audio in the calibration set or only when the calling application requests it.

1.4. Data Management of Persistent Objects

Persistent objects contain data, used during the speech processing, which need to be stored, either internally or externally, on a long-term basis. For example, in the case of speaker verification, the persistent objects include the calibration set, the calibration formula, the voice signatures and the verification formulas. As mentioned above, the API can be easily extended or modified to support other speech processing tasks. For example, in the case of word recognition, additional persistent objects such as "word signatures" and language models would be added to the API. In the case of speech compression, the persistent objects would likely include parameters of the recording media.

The API enables the calling application to control the management of the persistent objects. All handling operations (creating, adding audio to, and deleting) are available to the calling application, with the exception of persistent objects that are created as output from algorithmic processes. For example, a speaker's verification formula is the result of training the speaker's voice signature.

The API enables the calling application to determine, for each run-time instance of a persistent object (e.g. voice signature, calibration set, verification formula and calibration formula), whether it is stored internally in a data store of the speech processing system, or externally in a database of the calling application.

1.5. Dynamic Control of System Parameters

In prior art speech processing systems, parameters influencing the operation of the system are set prior to or at installation of the system and form a fixed configuration, which cannot be changed during the run-time operation of the system. In contrast, the API of the present invention allows run-time setting of system defaults and parameters. For example, in the case of speaker verification, system parameters that enable automatic addition of acquired audio to a voice signature and automatic training of a voice signature can be set dynamically at run-time by the calling application.

The API provides parameters for each object, for example a parameter that determines the storage policy for a particular run-time instance of a persistent object. These parameters can be set dynamically at run-time by the calling application.

2. THE API CLASSES AND METHODS 2.1. General API Classes

Figure 3:
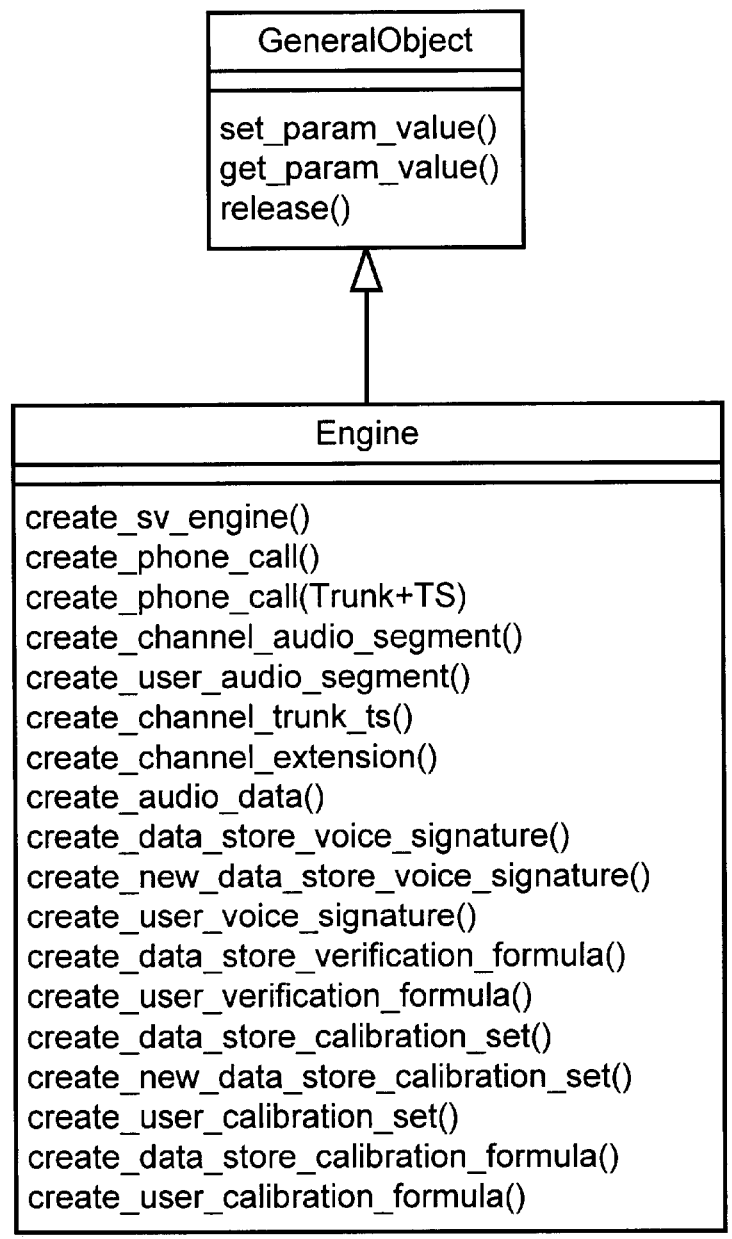
FIGS. 3, 4, 5 and 6 are diagrams of the classes of FIG. 2, shown in more detail, according to a preferred embodiment of the present invention.

Reference is now made to FIG. 3, which is a portion of the diagram of the API classes and their methods, according to a preferred embodiment of the present invention.

FIG. 3 shows a GeneralObject class and an Engine class factory object. Like all class factories, the Engine object creates all of the API objects (except for Callback and Notification objects). As will be seen with respect to FIGS. 3, 4 and 5, all API objects (excluding Callback and Notification objects) are derived from GeneralObject and inherit its methods release, set_param_value and get_param_value.

Releasing all API objects (excluding Callback and Notification objects) is done by calling the release method they inherit from the abstract base class GeneralObject. When the object is currently during processing, the speech processing system should reject the release method. When this occurs, it is the responsibility of the calling application to stop all processes of the object by calling the abort method of the appropriate Request object associated with the ongoing process.

The API provides the calling application with an interface to set and get all parameters of the objects. Each set of parameters is a structure comprising relevant parameter IDs and values. A list of the parameters, their descriptions, possible values and relevant structures, for the specific case of speaker verification, is given in Appendix C.

Parameters' structures are set when creating objects. Modifications and retrieval of parameters is performed using the set_param_value and get_param_value methods, respectively, inherited from GeneralObject. Some parameters can be defined as read only so that they cannot be modified. The speech processing system should provide a read-only error, which will result when trying to modify the read only parameters.

The calling application may use NULL instead of a pointer to any of the parameters' structures. This will instruct the speech processing system to use its internal default parameter values for the object.

When asynchronous methods (described hereinbelow with respect to FIG. 6) are called on an object, the relevant parameter values from the object are copied to the Request object associated with the method call. This allows the calling application to change the object's parameters and the Request's parameters independently.

The API provides a foundation for all objects to have parameters. The preferred embodiment of the API described herein contains only a portion of all the possible parameters. It will be appreciated by persons skilled in the art that the API provides a mechanism for creating additional parameters for the objects described herein that already have parameters, for creating parameters for objects described herein that currently do not have parameters, and for creating parameters for new objects.

2.2. Audio Acquisition API Classes

Reference is now made to FIG. 4, which is another portion of the diagram of the API classes and their methods, according to a preferred embodiment of the present invention. FIG. 4 shows the classes PhoneCall, AudioSegment, UserAudioSegment, AudioData, ChannelAudioSegment, Channel, ChannelTrunkTS and ChannelExtension, all of which relate to audio acquisition. FIG. 4 also shows the GeneralObject class, from which all the other classes of FIG. 4 are derived.

A PhoneCall object includes the audio contents of AudioSegment objects associated with it. Through its methods, the PhoneCall object provides the means for operations and algorithmic processes that are required during the audio acquisition. For example, in the case of speaker verification, the PhoneCall object supports methods for verification, addition to a VoiceSignature object, and addition to a CalibrationSet object.

An AudioSegment object is a container of input audio. AudioSegment's start and stop methods are used for controlling audio acquisition. The is_recording method is used for monitoring the acquisition process. The calling application may set a parameter of AudioSegment that determines when to stop the audio acquisition process. The parameter and related structure are described in Appendix C, section C.3 and Appendix A, section A.2.3, respectively.

An AudioSegment is an abstract base class that supports common functionality of its two derived classes: UserAudioSegment and ChannelAudioSegment.

A UserAudioSegment object allows the calling application to create an AudioSegment object using audio samples that are provided directly by the calling application. The UserAudioSegment object's method add_audio_data adds AudioData objects to the AudioSegment. An AudioData object includes actual raw (unprocessed) audio samples. Another use for the AudioData objects is when the calling application retrieves the original audio of a voice signature for playback.

A ChannelAudioSegment object allows the calling application to ask the speech processing system to acquire audio from an external communication channel. When creating a ChannelAudioSegment object, the calling application must provide the speech processing system with the means to identify a specific audio channel. Supplying a Channel object to the creation method does this. ChannelAudioSegment objects cannot be released before the stop method was called for them or their audio end point has been reached. The object's is_recording method can check for the recording status.

A ChannelAudioSegment object contains in it the Channel object that was supplied to the creation method of the ChannelAudioSegment object. The Channel object identifies the specific audio source from which audio is to be acquired.

For each possible environment, the API can be extended or modified to add new classes that inherit from the Channel class, the new classes providing the appropriate audio source identification means for the environment. The audio source can be specified in terms of a trunk and time slot, an extension number, the name and location of an audio file of a remote audio storage, or some other future input line indication. Channel is an abstract base class and cannot be created. In the current example, the derived classes ChannelTrunkTS and ChannelExtension are used for storing audio input line information. Each derived object supports a get_channel method that enables the calling application to retrieve the channel identifiers (a single string for ChannelExtension or a trunk and time slot pair for ChannelTrunkTS).

The UserAudioSegment, ChannelAudioSegment and Channel classes provide the calling application with a fully controlled audio acquisition mechanism. Using this mechanism, the calling application can associate ChannelAudioSegment and UserAudioSegment objects with a PhoneCall object, which is a logical element of audio, by calling the PhoneCall's add_audio_segment method. By adding an AudioSegment object to a PhoneCall object, all the audio contents of the AudioSegment object automatically become part of the PhoneCall object. The process of audio acquisition is uninterrupted. In addition to the fully controlled audio acquisition mechanism, the API provides a simplified audio acquisition mechanism for the common case that the calling application needs to do audio acquisition from a particular time slot of a telephone trunk. This simplified mechanism is provided through the PhoneCall object. The Engine method create_phone_call(Trunk+TS) specifying the trunk and time slot of a telephone channel creates a PhoneCall object and a single ChannelAudioSegment object (see below) associated with the PhoneCall object. The PhoneCall object created with this method supports the methods start, stop and is_recording for controlling audio acquisition by sampling the trunk and time slot of the telephone channel.

The PhoneCall object has a set of parameters that are described in Appendix C, section C.1. The parameters control the processing functions of the PhoneCall object. For example, in the case of speaker verification, setting the appropriate parameter of the PhoneCall object to "automatic" adds the audio contents to the calibration set whenever verification fails because the system has not yet been calibrated. The calling application may specify the calibration set the call should be added to. In another example, setting the appropriate parameter of the PhoneCall object to "automatic" adds the audio contents to a speaker's voice signature whenever a verification process fails and the caller's voice signature does not contain sufficient audio. It will be appreciated by persons skilled in the art that many more parameters can be added to the PhoneCall class as required.

2.3. Data Management API Classes

Figure 5:
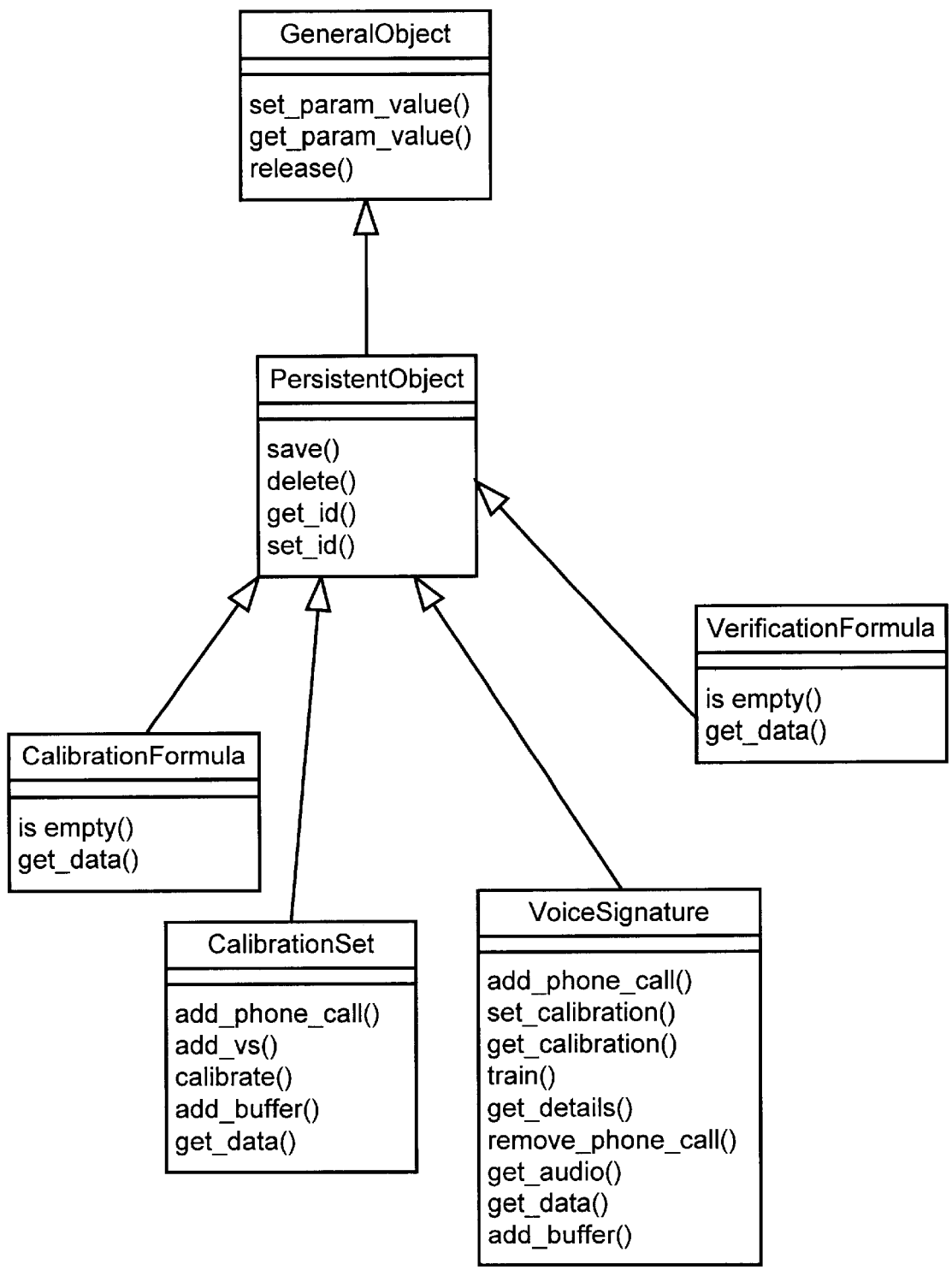

Reference is now made to FIG. 5, which is another portion of the diagram of the API classes and their methods, according to a preferred embodiment of the present invention. FIG. 5 shows the general data storage class PersistentObject and the GeneralObject class, from which it is derived.

As mentioned hereinabove, persistent objects contain data used during the speech processing which needs to be stored, either internally or externally, on a long-term basis. The API allows the calling application to determine whether each run-time instance of a persistent object is stored internally in the data store of the speech processing system or externally in the calling application's database.

All stored persistent objects are visible and can be retrieved, manipulated, or deleted by any calling application. Preferably, the speech processing system implements a locking mechanism that prevents concurrent changes and unintentional overwriting of stored data.

All persistent objects inherit save and delete methods from a parent PersistentObject class. These methods are used for performing transactions in the internal data store of the speech processing system.

The delete method is used for erasing a stored object from the speech processing system's internal data store. The save method saves the object in the speech processing system's internal data store. Preferably, the speech processing system permits overwriting stored objects only when the new object was originally created from the stored object itself (using a create_data_store_xxx method). All objects derived from the PersistentObject class have an ID property that can be viewed by the get_id method and changed by the set_id method.

Some persistent objects are created as a product of an algorithmic process, while others are created using distinct methods of the Engine class.

Persistent objects are retrieved from the speech processing system's internal data store using an appropriate Engine create_data_store_xxx method (where xxx specifies the object). Persistent objects are retrieved from an external database using an appropriate Engine create_user_xxx method (where xxx specifies the object). New persistent objects which are not created by an algorithmic process are created using an appropriate Engine create_new_xxx method. When creating objects from the calling application's database, the calling application must supply the data through the API.

FIG. 5 also shows classes for the specific example of speaker verification. These classes, which are derived from the PersistentObject class, are CalibrationFormula, CalibrationSet, VoiceSignature and VerificationFormula, and will be explained in more detail hereinbelow.

2.3.1. VoiceSignature

A VoiceSignature object represents the voice signature of a speaker in a speaker verification system, the voice signature containing audio samples of the speaker. A VoiceSignature object contains the audio from PhoneCall objects for a particular speaker. The calling application creates a VoiceSignature object using an appropriate Engine create method and by specifying a VoiceSignature ID. Adding and removing audio content of a PhoneCall object to and from a VoiceSignature object is accomplished using the add_phone_call and remove_phone_call methods, respectively. Setting an appropriate parameter of the VoiceSignature object, see Appendix C, section C.4, sets automatic training of a voice signature. When the parameter is set to "automatic", automatic training is performed whenever the VoiceSignature accumulates sufficient audio for training.

The calling application can get details about the number of PhoneCall objects whose audio content has been added to the VoiceSignature object, their respective audio length and the VoiceSignature status using the get_details method.

The calling application can retrieve the binary contents of a VoiceSignature object using the get_data method. The binary data retrieved by the get_data method does not include the object's ID.

The API provides a service for extracting the original audio from a VoiceSignature object and supplying it to the calling application for playback purposes. The service is provided by the get audio method and uses the AudioData class.

The VoiceSignature object's method train is used to build the particular speaker's verification formula from the audio. A parameter of the VoiceSignature object, see Appendix C, section C.4, determines whether the object is permanently stored or kept in the speech processing system's internal data store only until its respective VerificationFormula object has been used several times (the number of times is a system parameter).

2.3.2. VerificationFormula

The VerificationFormula object represents the verification formula of a speaker in a speaker verification system, which includes the special voice characteristics of the speaker. The verification formula is created during training of the speaker's voice signature and is a prerequisite for verification. The VoiceSignature object's train method constructs a VerificationFormula object. As shown in FIG. 4, VerificationFormula objects can be supplied by the calling application as an argument to the PhoneCall object's verify method. When a VerificationFormula object is stored in the speech processing system's internal data store, the verify method can be invoked using a VerificationFormula ID rather than a VerificationFormula object.

An instance of a VerificationFormula object is created by the calling application using an appropriate Engine create method and specifying a VerificationFormula ID.

The calling application can retrieve the binary contents of a VerificationFormula object using the get_data method. The binary data retrieved by the get_data method does not include the object's ID. The VerificationFormula object's is_empty method is used to check whether the object contains valid data.

2.3.3. CalibrationSet

A CalibrationSet object is used by the calling application as input for the system's calibration process. A CalibrationSet object includes audio contents of phone calls or voice signatures.

A CalibrationSet object is created by the calling application using an appropriate Engine create method and by specifying a CalibrationSet ID. When creating an instance of a CalibrationSet object from the calling application's database (using Engine create_user_calibration_set method), additional data buffers can be added to the object using the object's add_buffer method.

The calling application can add the audio contents of a VoiceSignature object or of a PhoneCall object to a CalibrationSet object using the add_vs and add_phone_call methods respectively.

Setting an appropriate parameter of the CalibrationSet object, see Appendix C, section C.5, sets automatic calibration of a calibration set. When the parameter is set to "automatic", automatic calibration is performed whenever the CalibrationSet accumulates sufficient audio for calibration.

The calling application can retrieve the binary contents of a CalibrationSet object using the get_data method. The binary data retrieved by the get_data method does not include the object's ID.

Calibration is performed using the CalibrationSet object's calibrate method, and results in the construction of a CalibrationFormula object. A CalibrationFormula object is used by the calling application as an argument to the training process (performed by the VoiceSignature object's train method).

2.3.4. CalibrationFormula

A CalibrationFormula object is created by the calling application using an appropriate Engine create method and specifying a CalibrationFormula ID. The calling application can retrieve the binary contents of a CalibrationFormula object using the get_data method. The binary data retrieved by the get_data method does not include the object's ID.

2.4. Request, Scores, Callback and Notification API Classes

Figure 6:
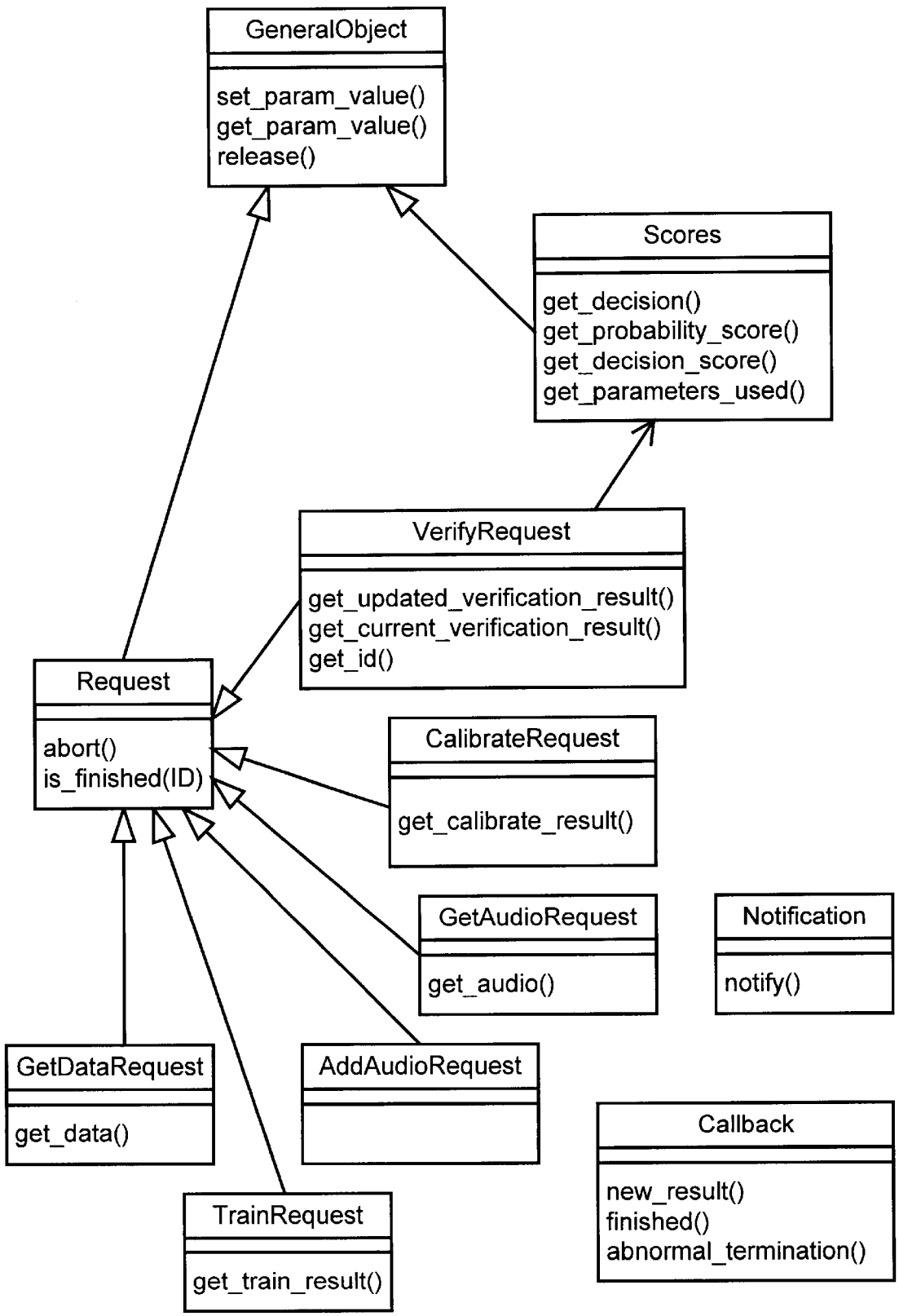

Reference is now made to FIG. 6, which is another portion of the diagram of the API classes and their methods, according to a preferred embodiment of the present invention. FIG. 6 shows the Request class and the GeneralObject class, from which it is derived. FIG. 6 also shows the Callback and Notification classes, which are implemented by the calling application.

All operations of the speech processing system are implemented using methods of the relevant objects. All methods return an error code notifying the status of the operation's execution. Some operations are synchronous and are completed when their method call returns, and some are asynchronous, requiring further processing. When asynchronous operations take place, a callback mechanism allows the speech processing system to notify the calling application of the operation's status.

Preferably, whenever an asynchronous operation is performed, the speech processing system creates a Request object and returns it to the calling application. The Request object is an instance of one of the classes derived from the Request class. This object is used as a handle by the calling application to access the ongoing asynchronous processing. Through the Request object, the calling application can abort the processing (using the abort method), check for its completion (using the is_finished method) or change the operation parameters.

The results of asynchronous operations are transferred back to the calling application using the methods of an appropriate Request object. In the specific case of speaker verification, examples of asynchronous operations are the methods train, get_audio, get_data and add_phone_call of the VoiceSignature object, the method verify of the PhoneCall object, and the methods add_phone.call, add_vs, and get_data of the CalibrationSet object. Some methods (for example: verify) may have multiple asynchronous results. For example, verification results can be automatically reported every "x" seconds of accumulated audio as determined by one of the parameters of the PhoneCall object.

Results of an asynchronous operation are indicated to the calling application using a Callback object. Preferably, the calling application creates a Callback object and supplies it to the speech processing system as an argument of the method call. The Callback object is implemented by the calling application and must include the following methods: new_result, to indicate the presence of new results, finished, to indicate the completion of the operation, and abnormal_termination, to indicate abnormal termination of the operation.

The speech processing system calls the new_result method whenever it has a result update or additional information that needs to be transferred to the calling application. When receiving this indication, the calling application should use the relevant Request object's method to receive the actual update data, e.g. get_train_result for the Train-Request object. The speech processing system calls the finished method whenever it needs to indicate to the calling application that a certain asynchronous operation was completed. The speech processing system calls the abnormal_termination method whenever it needs to notify the calling application that a certain asynchronous operation has been abnormally terminated.

All of the classes derived from the Request class (excluding AddAudioRequest) have appropriate methods for retrieving the latest relevant updates of the asynchronous operation. These methods should be called by the calling application whenever the speech processing system calls the new_result method of the Callback object associated with the request. For a method with a single asynchronous result, the speech processing system will first call the Callback's $new_{13}$ result method and then its finished method.

The API provides a notification mechanism for system control and monitoring. The mechanism allows the calling application to receive system event logs via a Notification object, which is implemented by the calling application. Preferably, the speech processing system calls the Notification object's method notify whenever a log message should be transferred to the calling application. The Notification object is transferred to the speech processing system as a parameter of the Engine object using the set_param_value method. A log message includes a type indication (error, warning, information), severity, and the message text (string).

FIG. 6 also shows classes for the specific example of speaker verification. The GetDataRequest, TrainRequest, AddAudioRequest, GetAudioRequest, CalibrateRequest and VerifyRequest classes are all derived from the class Request. The Scores class is derived from the GeneralObject class, and a Scores object is created as the output of certain methods of the VerifyRequest class.

2.4.1. GetDataRequest

The GetDataRequest object is returned from the get_data methods of the VoiceSignature and CalibrationSet objects. The GetDataRequest object has a method get_data which provides a buffer of data to the calling application.

2.4.2. TrainRequest

The TrainRequest object is returned from the train method of the VoiceSignature object. The TrainRequest object has a method get_train_result which provides a VerificationFormula object to the calling application.

2.4.3. AddAudioRequest

The AddAudioRequest object is returned from the add_phone_call of the VoiceSignature object and the add_phone_call and add_voice_signature methods of the CalibrationSet object. The AddAudioRequest object has no methods.

2.4.4. GetAudioRequest

The GetAudioRequest object is returned from the get_audio method of the VoiceSignature object. The GetAudioRequest object has a method get_audio which provides audio data to the calling application.

2.4.5. CalibrateRequest

The CalibrateRequest object is returned from the calibrate method of the CalibrationSet object. The CalibrateRequest object has a method get_calibrate_result which provides a CalibrationFormula object to the calling application.

2.4.6. VerifyRequest

The VerifyRequest object has two methods for retrieving verification results from the speech processing system, get_current_verification_result and get_updated_verification_result. The speech processing system calculates verification results at regular intervals (set by the "Results update policy" parameter, see Appendix C, section C.1). The method get_updated_verification_result retrieves the verification results calculated at the end of the most recent interval, whereas the method get_current_verification_result retrieves the verification results at the current moment.

The VerifyRequest get_id method enables the calling application to receive the internal ID of the verification request, so that verification tasks may be monitored, and if necessary, debugged.

2.4.7. Scores

The Scores object contains the results of verification method calls. It is created by the speech processing system when the calling application requests verification results using the get_updated_verification_result or get_current_verification_result methods of the VerifyRequest object.

The calling application can get a single decision value (accept/reject/inconclusive) for the object using the get_decision method and/or get the exact received probability score using the get_probability_score method.

Using the get_params_used method, the calling application can retrieve the relevant parameters (see Appendix C, section C.1, "Results decision policy", "Results update policy" and "Audio length for verification") that were used for creating the object.

As mentioned above, the API can be easily extended to support other speech processing tasks. New objects similar to the Scores object could be created for results of other processing or recognition tasks.

It will be appreciated by persons skilled in the art that the present invention is not limited by what has been particularly shown and described herein above, rather the scope of the invention is defined by the claims that follow the appendices.

APPENDIX A

API DATA TYPES

A.1 User Defined Types

| User Defined Type | Explanation |
|---|---|
| API_U_BYTE | Unsigned byte type |
| API_S_BYTE | Signed byte type |
| API_U_WORD2 | Unsigned 2 bytes type |
| API_S_WORD2 | Signed 2 bytes type |
| API_U_WORD4 | Unsigned 4 bytes type |
| API_S_WORD4 | Signed 4 bytes type |
| API_PTR | Pointer type - (void*) |
| API_FLOAT | Floating point type |
| API_STRING | Char* (we may later want unicode support) |
| API_BOOL | Boolean |
| API_RET | A return code type for returning status from API functions. (Implemented as API_U_BYTE) |

A.2 User Defined Structures

A.2.1 API_BUFFER {
// a general buffer
API_U_WORD4   length;   //in bytes
Void*         data;
}

A.2.2 API_VS_DETAILS {
/* Details of a voice signature - includes status, number of phone calls in the VS, and the audio length for each call
- Status - one of the following:
- API_VSS_INSUFFICIENT_AUDIO - signature does not contain sufficient audio.
- API_VSS_READY - signature is ready for training.
- API_VSS_TRAINED - signature trained.
*/
API_U_BYTE    status;
API_U_BYTE    num_calls;
API_U_WORD4*  call_audio_length;   // in seconds
}

A.2.3 API_AUDIO_END_POINT {
/* The structure defines audio end point (i.e. when to stop recording incoming audio)
Type - one of the following:
- API_AEP_EXPLICIT - explicit val seconds after start point
- API_AEP_INFINITE - "infinite" until stop is called
Val - relevant for API_AEP_EXPLICIT, API_AEP_RESULTS. otherwise use NULL
*/
API_U_BYTE    type;
API_U_WORD4   val;
}

A.2.4 API_UPDATE_POLICY {
/* The structure defines verification results update policy.
Type1 - one of the following:
- API_UP_AUDIO_END - update when audio ends
- API_UP_SCORE - update when val1 score (percentage) is first reached
- API_UP_PERIODIC - update every val1 seconds of accumulated audio
- API_UP_IMMEDIATE - update when verification is invoked.
Val1 - relevant for API_UP_SCORE, API_UP_PERIODIC.
- For API_UP_SCORE - a score when first reached will generate an update.
- For API_UP_PERIODIC - The number of seconds between updates.
- For other types - use NULL
Val2 - Terminate verification after n scores updates (relevant for API_UP_PERIODIC only)
- Terminate verification after Val2 scores updates.
- For infinite - use NULL.
*/
API_U_BYTE    type;
API_U_WORD4   val1;
API_U_WORD4   val2;
}

A.2.5 API_DECISION_POLICY {
/* The structure defines the results decision policy for receiving verification results
Type - one of the following:
- API_DP_MIN_ERROR - according to the minimum sum of errors
- API_DP_DEC_THRESHOLD - according to the minimum and maximum thresholds for the single decision
- API_DP_FALSE_ACCEPT - a minimal threshold for false acceptance
- API_DP_FALSE_REJECT - a minimal threshold for false rejection
Val1 -
- For API_DP_MIN_ERROR use NULL.
- For API_DP_DEC_THRESHOLD a value for single decision rejection threshold
- For API_DP_FALSE_ACCEPT or API_DP_FALSE_REJECT specifies the (percentage) value for false acceptance or false rejection threshold respectively
Val2 -

APPENDIX A-continued

API DATA TYPES

- For API_DP_MIN_ERROR use NULL.
- For API_DP_DEC_THRESHOLD a value for single decision acceptance threshold
- For API_DP_FALSE_ACCEPT or API_DP_FALSE_REJECT use NULL

```
        */
        API_U_BYTE    type;
        API_U_BYTE    val1;
        API_U_BYTE    val2;
        }
A.2.6   API_UNPROC_AUDIO {
        /* Structure of audio samples
        The two currently supported formats are:
            AUDIO_FORMAT_PCM_8KHZ, little Indian, no headers.
            AUDIO_FORMAT_LINEAR_8KHZ, little Indian, no headers.
        */
        API_U_WORD4   length;    //in bytes
        API_U_BYTE    format;
        Void*                   audio_samples
        }
```

APPENDIX B

API OBJECTS

B.1 General Classes
B.1.1 GeneralObject
Supports general common functionality.
B.1.1.1 Object creation:
Abstract base class - cannot be created
B.1.1.2 Methods:
- API_RET set_param_value(API_U_WORD4 parameter_id, void* param_value);
Possible returned error codes:
  - API_ERR_INVALID_ARGUMENTS
  - API_ERR_READ_ONLY
  - API_ERR_NOT_IMPLEMENTED
  - API_ERR_GENERAL
- API_RET get_param_value(API_U_WORD4 parameter_id, void* param_value);
Possible returned error codes:
  - API_ERR_INVALID_ARGUMENTS
  - API_ERR_NOT_IMPLEMENTED
  - API_ERR_GENERAL
- API_RET release( );
Possible returned error codes:
  - API_ERR_OBJECT_IN_USE
  - API_ERR_NOT_IMPLEMENTED
  - API_ERR_GENERAL
B.1.1.3 Derived Classes:
All API classes that are not callback classes are derived from GeneralObject class.
B.2 Audio Acquisition Classes
B.2.1 PhoneCall
B.2.1.1 Object creation:
Abstract base class - objects created by the Engine methods:
API_RET create_phone_call(PhoneCall** phone_call, API_U_BYTE TrunkNum, API_U_BYTE TimeSlotNum);
- Used for the simplified audio acquisition mechanism.
Possible returned error codes:
  - API_ERR_INVALID_ARGUMENTS
  - API_ERR_NOT_ENOUGH_RESOURCES
  - API_ERR_NOT_IMPLEMENTED
  - API_ERR_GENERAL
API_RET create_phone_call(PhoneCall** phone_call);
- Used for the full control audio acquisition mechanism.
Possible returned error codes:
  - API_ERR_INVALID_ARGUMENTS
  - API_ERR_NOT_ENOUGH_RESOURCES
  - API_ERR_NOT_IMPLEMENTED
  - API_ERR_GENERAL
B.2.1.2 Methods:
- API_RET verify (VerificationFormula* ver_formula, CallbackObject* cbo, VerifyRequest** request);
Possible returned error codes:
  - API_ERR_INVALID_ARGUMENTS
  - API_ERR_NOT_ENOUGH_RESOURCES
  - API_OPERATION_IN_PROCESS

APPENDIX B-continued

API OBJECTS

- API_ERR_NOT_IMPLEMENTED
- API_ERR_GENERAL
- API_RET verify(CHAR* ver_formula_ID, CallbackObject* cbo, VerifyRequest** request);
    - For use when VerificationFormula is stored in the speech processing system's data store.

Possible returned error codes:
- API_ERR_INVALID_ARGUMENTS
- API_ERR_NOT_ENOUGH_RESOURCES
- API_ERR_NO_AVAILABLE_FORMULA
- API_OPERATION_IN_PROCESS
- API_ERR_NOT_IMPLEMENTED
- API_ERR_GENERAL
- API_RET add_audio_segment(AudioSegment* aud_seg);

Possible returned error codes:
- API_ERR_INVALID_ARGUMENTS
- API_ERR_NOT_IMPLEMENTED
- API_ERR_GENERAL
- API_RET add_to_voice_signature(CHAR* voice_signature_ID, CallbackObject* cbo, AddAudioRequest** request);

Possible returned error codes:
- API_ERR_INVALID_ARGUMENTS
- API_ERR_NOT_ENOUGH_RESOURCES
- API_ERR_NOT_IMPLEMENTED
- API_ERR_GENERAL
- API_RET start( );

Possible returned error codes:
- API_ERR_NOT_ENOUGH_RESOURCES
- API_ERR_NOT_IMPLEMENTED
- API_ERR_GENERAL
- API_RET stop( );

Possible returned error codes:
- API_ERR_NOT_IMPLEMENTED
- API_ERR_GENERAL
- API_RET is_recording(API_BOOL* rec_status);

Possible returned error codes:
- API_ERR_NOT_IMPLEMENTED
- API_ERR_GENERAL

Note: The start, stop and is_recording methods are supported when using the simplified audio acquisition mechanism.

B.2.2 AudioSegment
B.2.2.1 Object creation:
Abstract base class - cannot be created
B.2.2.2 Methods:
- API_RET start( );

Possible returned error codes:
- API_ERR_NOT_ENOUGH_RESOURCES
- API_ERR_NOT_IMPLEMENTED
- API_ERR_GENERAL
- API_RET stop( );

Possible returned error codes:
- API_ERR_NOT_IMPLEMENTED
- API_ERR_GENERAL
- API_RET is_recording(API_BOOL* rec_status);

Possible returned error codes:
- API_ERR_NOT_IMPLEMENTED
- API_ERR_GENERAL

B.2.2.3 Derived Classes:
- ChannelAudioSegment
- UserAudioSegment

Note: The stop method can be called to force AudioSegment recording termination when the "audio end point" parameter states a future end point.
Start/stop methods can be called only once each on any single AudioSegment.

B.2.3 ChannelAudioSegment
B.2.3.1 Object creation:
Abstract base class - objects created by the Engine method:
API_RET create_channel_audio_segment(Channel* channel, CallbackObject* cbo, ChannelAudioSegment** chan_audseg);

Possible returned error codes:
- API_ERR_INVALID_ARGUMENTS
- API_ERR_NOT_ENOUGH_RESOURCES
- API_ERR_NOT_IMPLEMENTED
- API_ERR_GENERAL

APPENDIX B-continued

API OBJECTS

B.2.3.2 Methods:
    N/A

Note: when creating a ChannelAudioSegment object a Callback object is required. The Callback object is used by the speech processing system to notify the calling application the recording status of the segment.
When the recording has successfully completed (reaching a specified "audio end point" or explicitly stopped by the calling application), the finished method is called.
When the segment recording is abnormally been stopped, the abnormal_termination method is called.

B.2.4 UserAudioSegment
B.2.4.1 Object creation:
    Abstract base class - objects created by the Engine method:
    API_RET create_user_audio_segment(AudioData* audiodata, CallbackObject* cbo,
        UserAudioSegment** user_audseg);
    Possible returned error codes:
- API_ERR_INVALID_ARGUMENTS
- API_ERR_NOT_ENOUGH_RESOURCES
- API_ERR_NOT_IMPLEMENTED
- API_ERR_GENERAL B.2.4.2 Methods:
- API_RET add_audio_data(AudioData* audiodata);

Possible returned error codes:
- API_ERR_INVALID_ARGUMENTS
- API_ERR_NOT_IMPLEMENTED
- API_ERR_GENERAL Note: When creating a UserAudioSegment object, a Callback object is required. The Callback object is used by the speech processing system to notify the calling application the status for this segment. When no more audio is required (according to the specified "audio end point" policy or when stop method is called by the calling application), the finished method is called.
When the segment's audio processing is abnormally stopped, the abnormal_termination method is called.
The use of start and stop methods controls audio acquisition and thus effects algorithmic operations.

B.2.5 Channel
    Used for indicating an audio source for audio that is acquired using the speech processing system. Used for ChannelAudioSegment only.
B.2.5.1 Object creation:
    Abstract base class - cannot be created
B.2.5.2 Methods:
    N/A
B.2.5.3 Derived Classes:
- ChannelTrunkTS
- ChannelExtension B.2.6 ChannelTrunkTS
B.2.6.1 Object creation:
    Abstract base class - objects created by the Engine method:
    API_RET create_channel_trunk_ts(API_U_BYTE TrunkNum, API_U_BYTE TimeSlotNum,
    ChannelTrunkTS** chan_trunk_ts);
        Possible returned error codes:
- API_ERR_INVALID_ARGUMENTS
- API_ERR_NOT_ENOUGH_RESOURCES
- API_ERR_NOT_IMPLEMENTED
- API_ERR_GENERAL B.2.6.2 Methods:
- API_RET get_channel(API_U_BYTE TrunkNum, API_U_BYTE TimeSlotNum);

Possible returned error codes:
- API_ERR_INVALID_ARGUMENTS
- API_ERR_NOT_IMPLEMENTED
- API_ERR_GENERAL B.2.7 ChannelExtension
B.2.7.1 Object creation:
    Abstract base class - objects created by the Engine method:
    API_RET create_channel_extension(API_STRING extension, ChannelExtension**
    chan_extension);
    Possible returned error codes:
- API_ERR_INVALID_ARGUMENTS
- API_ERR_NOT_ENOUGH_RESOURCES
- API_ERR_NOT_IMPLEMENTED
- API_ERR_GENERAL B.2.7.2 Methods:
- API_RET get_channel(API_STRING extension);

Possible returned error codes:
- API_ERR_INVALID_ARGUMENTS
- API_ERR_NOT_IMPLEMENTED
- API_ERR_GENERAL

APPENDIX B-continued

API OBJECTS

B.2.8 AudioData
Used for supplying unprocessed audio samples to the speech processing system. Used only when audio is explicitly supplied by the calling application (user audio).

B.2.8.1 Object creation;
Abstract base class - objects created by the Engine method:
API_RET create_audio_data(API_UNPROC_AUDIO audio, AudioData** aud_data);
Possible returned error codes:
- API_ERR_INVALID_ARGUMENTS
- API_ERR_NOT_ENOUGH_RESOURCES
- API_ERR_NOT_IMPLEMENTED
- API_ERR_GENERAL B.2.8.2 Methods:
N/A B.3 Algorithmic Classes B.3.1 PersistentObject
Support common functionality of persistent objects.

B.3.1.1 Object creation:
Abstract base class - cannot be created

B.3.1.2 Methods:
- API_RET save( );
Possible returned error codes:
- API_ERR_NOT_ENOUGH_RESOURCES
- API_ERR_OBJECT_OVERWRITE_DENIED
- API_ERR_NOT_IMPLEMENTED
- API_ERR_GENERAL
- API_ERR_STORAGE_FULL
- API_RET delete( );
Possible returned error codes:
- API_ERR_NOT_ENOUGH_RESOURCES
- API_ERR_OBJECT_NOT_IN_DATA_STORE
- API_ERR_NOT_IMPLEMENTED
- API_ERR_GENERAL Note: Save and Delete methods operates on the speech processing system's own data store.
Save's OBJECT_OVERWRITE_DENIED error occurs when attempting to overwrite a stored object with an object that was created from a different source. This error prevents accidental deletion and overwriting of stored objects.
- API_RET set_id(API_STRING vs_id);
Possible returned error codes:
- API_ERR_INVALID_ARGUMENTS
- API_ERR_NOT_IMPLEMENTED
- API_ERR_GENERAL
- API_RET get_id(API_STRING vs_id);
Possible returned error codes:
- API_ERR_NOT_IMPLEMENTED
- API_ERR_GENERAL B.3.1.3 Derived Classes:
All the API classes that represent persistent objects (namely: VoiceSignature, VerificationFormula, CalibrationSet, and CalibrationFormula) are derived from the GeneralObject class.

B.3.2 VoiceSignature

B.3.2.1 Object creation:
Abstract base class - objects created by the Engine methods:
API_RET create_data_store_voice_signature(API_STRING vs_id, VoiceSignature** vs);
   -Creating a VoiceSignature object from as object stored in the speech processing system's data store
Possible returned error codes:
- API_ERR_INVALID_ARGUMENTS
- API_ERR_NOT_ENOUGH_RESOURCES
- API_ERR_OBJECT_NOT_IN_DATA_STORE
- API_ERR_OBJECT_LOCKED
- API_ERR_NOT_IMPLEMENTED
- API_ERR_GENERAL
API_RET create_new_voice_signature(API_STRING vs_id, VoiceSignature** vs);
   -Creating a new VoiceSignature object.
Possible returned error codes:
- API_ERR_INVALID_ARGUMENTS
- API_ERR_NOT_ENOUGH_RESOURCES
- API_ERR_NOT_IMPLEMENTED
- API_ERR_GENERAL
API_RET create_user_voice_signature(API_BUFFER* user_vs, API_STRING vs_id, VoiceSignature** vs);
   -Creates VoiceSignature object using user supplied audio samples.
Possible returned error codes:
- API_ERR_INVALID_ARGUMENTS
- API_ERR_NOT_ENOUGH_RESOURCES

APPENDIX B-continued
API OBJECTS

- API_ERR_NOT_IMPLEMENTED
- API_ERR_GENERAL

B3.2.2 Methods:
- API_RET add_phone_call(PhoneCall* phone_call, CallbackObject* cbo, AddAudioRequest** request);

Possible returned error codes:
- API_ERR_INVALID_ARGUMENTS
- API_ERR_NOT_ENOUGH_RESOURCES
- API_ERR_NOT_IMPLEMENTED
- API_ERR_GENERAL
- API_RET set_calibration(CalibrationFormula* cf);

Possible returned error codes:
- API_ERR_INVALID_ARGUMENTS
- API_ERR_NOT_CALIBRATED
- API_ERR_NOT_IMPLEMENTED
- API_ERR_GENERAL
- API_RET get_calibration(CalibrationFormula** cf);

Possible returned error codes:
- API_ERR_GENERAL
- API_RET train(CallbackObject* cbo, TrainRequest** request);

Possible returned error codes:
- API_ERR_INVALID_ARGUMENTS
- API_ERR_NOT_ENOUGH_RESOURCES
- API_ERR_OPERATION_IN_PROCESS
- API_ERR_NO_AVAILABLE_CALIBRATION
- API_ERR_NOT_IMPLEMENTED
- API_ERR_GENERAL
- API_RET get_details(API_VS_DETAILS* vs_details);

Possible returned error codes:
- API_ERR_INVALID_ARGUMENTS
- API_ERR_NOT_IMPLEMENTED
- API_ERR_GENERAL
- API_RET remove_phone_call(API_U_BYTE phone_call_number);

Possible returned error codes:
- API_ERR_INVALID_ARGUMENTS
- API_ERR_NOT_ENOUGH_RESOURCES
- API_ERR_NOT_IMPLEMENTED
- API_ERR_GENERAL
- API_RET get_audio(API_U_BYTE phone_call_number, CallbackObject* cbo, GetAudioRequest** request);   // for playback Possible returned error codes:
- API_ERR_INVALID_ARGUMENTS
- API_ERR_NOT_ENOUGH_RESOURCES
- API_ERR_NOT_IMPLEMENTED
- API_ERR_GENERAL
- API_RET get_data(CallbackObject* cbo, GetDataRequest** request);

Possible returned error codes:
- API_ERR_INVALID_ARGUMENTS
- API_ERR_NOT_ENOUGH_RESOURCES
- API_ERR_NOT_IMPLEMENTED
- API_ERR_GENERAL
- API_RET add_buffer(API_BUFFER* vs_buffer);

Possible returned error codes:
- API_ERR_INVALID_ARGUMENTS
- API_ERR_NOT_ENOUGH_RESOURCES
- API_ERR_NOT_IMPLEMENTED
- API_ERR_GENERAL Note: The method create_user_voice_signature enables the calling application to add a voice signature buffer to the created user VoiceSignature object. If NULL is used as the voice signature buffer argument, an empty user VoiceSignature object is created.
The method add_buffer is available only when the VoiceSignature object is created for user input data (using the create_user_voice_signature method).

B.3.3 VerificationFormula

B.3.3.1 Object creation:
Abstract base class - objects created by the Engine methods:
API_RET create_data_store_verification_formula(API_STRING vf_id, VerificationFormula** vf);

Possible returned error codes:
- API_ERR_INVALID_ARGUMENTS
- API_ERR_NOT_ENOUGH_RESOURCES
- API_ERR_OBJECT_LOCKED
- API_ERR_NOT_IMPLEMENTED
- API_ERR_GENERAL API_RET create_user_verification_formula(API_BUFFER* ver_form, API_STRING vs_id, VerificationFormula** vf);

Possible returned error codes:

APPENDIX B-continued

API OBJECTS

- API_ERR_INVALID_ARGUMENTS
- API_ERR_NOT_ENOUGH_RESOURCES
- API_ERR_NOT_IMPLEMENTED
- API_ERR_GENERAL

B.3.3.2 Methods:
- API_RET is_empty(API_BOOL* empty);
Possible returned error codes:
- API_ERR_NOT_ENOUGH_RESOURCES
- API_ERR_NOT_IMPLEMENTED
- API_ERR_GENERAL
- API_RET get_data(API_BUFFER* vf_data);
Possible returned error codes:
- API_ERR_NOT_ENOUGH_RESOURCES
- API_ERR_NOT_IMPLEMENTED
- API_ERR_GENERAL B.3.4 CalibrationSet
B.3.4.1 Object creation:
Abstract base class - objects created by the Engine methods:
API_RET create_data_store_calibration_set(API_STRING cal_set_id, CalibrationSet** cal_set);
Possible returned error codes:
- API_ERR_INVALID_ARGUMENTS
- API_ERR_NOT_ENOUGH_RESOURCES
- API_ERR_OBJECT_NOT_IN_DATA_STORE
- API_ERR_OBJECT_LOCKED
- API_ERR_NOT_IMPLEMENTED
- API_ERR_GENERAL API_RET create_new_calibration_set(API_STRING cal_set_id, CalibrationSet** cal_set);
Possible returned error codes:
- API_ERR_INVALID_ARGUMENTS
- API_ERR_NOT_ENOUGH_RESOURCES
- API_ERR_NOT_IMPLEMENTED
- API_ERR_GENERAL
    API_RET create_user_calibration_set(API_BUFFER* user_cal_set, API_STRING cal_set_id, CalibrationSet** cal_set);
Possible returned error codes:
- API_ERR_INVALID_ARGUMENTS
- API_ERR_NOT_ENOUGH_RESOURCES
- API_ERR_NOT_IMPLEMENTED
- API_ERR_GENERAL B.3.4.2 Methods:
- API_RET add_phone_call(API_STRING group_in_set, PhoneCall* call, CallbackObject* cbo, AddAudioRequest** request);
Possible returned error codes:
- API_ERR_INVALID_ARGUMENTS
- API_ERR_NOT_ENOUGH_RESOURCES
- API_ERR_NOT_IMPLEMENTED
- API_ERR_GENERAL
- API_RET add_vs(API_STRING group_in_set, VoiceSignature* vs, CallbackObject* cbo, AddAudioRequest** request);
Possible returned error codes:
- API_ERR_INVALID_ARGUMENTS
- API_ERR_NOT_ENOUGH_RESOURCES
- API_ERR_NOT_IMPLEMENTED
- API_ERR_GENERAL
- API_RET calibrate(CallbackObject* cbo, CalibrateRequest** request);
Possible returned error codes:
- API_ERR_INVALID_ARGUMENTS
- API_ERR_NOT_ENOUGH_RESOURCES
- API_ERR_OPERATION_IN_PROCESS
- API_ERR_NOT_IMPLEMENTED
- API_ERR_GENERAL
- API_RET add_buffer(API_BUFFER* cal_set_buffer);
Possible returned error codes:
- API_ERR_INVALID_ARGUMENTS
- API_ERR_NOT_ENOUGH_RESOURCES
- API_ERR_NOT_IMPLEMENTED
- API_ERR_GENERAL
- API_RET get_data(CallbackObject cbo, GetDataRequest request);
Possible returned error codes:
- API_ERR_INVALID_ARGUMENTS
- API_ERR_NOT_ENOUGH_RESOURCES
- API_ERR_NOT_IMPLEMENTED
- API_ERR_GENERAL Note: The method create_user_calibration_set enables the calling application to add a calibration set buffer to the created CalibrationSet object. If NULL is used as the calibration set buffer argument, an empty CalibrationSet object is created.

APPENDIX B-continued

API OBJECTS

The method add_cal_set_buffer is available only when the CalibrationSset object is
created for user input data (using the create_user_calibration_set method).
The group_in_set argument of the add_phone_call and add_vs methods can be NULL. In
this case, the audio content is added to a default calibration group.

B.3.5     CalibrationFormula
B.3.5.1    Object creation;
         Abstract base class - objects created by the Engine methods:
         API_RET create_data_store_calibration_formula(API_STRING cf_id, CalibrationFormula**
         cal_form);
         Possible returned error codes:
- API_ERR_INVALID_ARGUMENTS
- API_ERR_NOT_ENOUGH_RESOURCES
- API_ERR_NOT_IMPLEMENTED
- API_ERR_GENERAL API_RET create_user_calibration_formula(API_BUFFER* user_cal_form, API_STRING
         cf_id, CalibrationFormula** cal_form);
         Possible returned error codes:
- API_ERR_INVALID_ARGUMENTS
- API_ERR_NOT_ENOUGH_RESOURCES
- API_ERR_NOT_IMPLEMENTED
- API_ERR_GENERAL B.3.5.2    Methods:
- API_RET is_empty(API_BOOL* empty);

Possible returned error codes:
- API_ERR_NOT_ENOUGH_RESOURCES
- API_ERR_NOT_IMPLEMENTED
- API_ERR_GENERAL
- API_RET get_data(API_BUFFER* cal_form);

Possible returned error codes:
- API_ERR_NOT_ENOUGH_RESOURCES
- API_ERR_NOT_IMPLEMENTED
- API_ERR_GENERAL B.4      Request Classes
B.4.1     Request
B.4.1.1    Object creation:
         Abstract base class - cannot be created
B.4.1.2    Methods:
- API_RET abort( );

Possible returned error codes:
- API_ERR_GENERAL
- API_RET is_finished(API_BOOL execution_status);

Possible returned error codes:
- API_ERR_INVALID_ARGUMENTS
- API_ERR_GENERAL

B.4.1.3    Derived Classes:
- VerifyRequest
- TrainRequest
- CalibrateRequest
- AddAudioRequest
- GetDataRequest
- GetAudioRequest B.4.2     VerifyRequest
B.4.2.1    Object creation:
         Automatic - returned from verify method call.
B.4.2.2    Methods:
- API_RET get_updated_verification_result(Scores** scores);

Get the latest updated verification scores.
         Possible returned error codes:
- API_ERR_FAULTY_AUDIO
- API_ERR_NOT_IMPLEMENTED
- API_ERR_AUDIO_TOO_SHORT
- API_ERR_GENERAL
- API_RET get_current_verification_result(Scores** scores);

Calculate and retrieve current verification scores.
         Possible returned error codes:
- API_ERR_FAULTY_AUDIO
- API_ERR_NOT_IMPLEMENTED
- API_ERR_AUDIO_TOO_SHORT
- API_ERR_GENERAL
- API_RET get_id(API_STRING vs_id);

Possible returned error codes:
- API_ERR_NOT_IMPLEMENTED
- API_ERR_GENERAL

B.4.3     TrainRequest
B.4.3.1    Object creation:
         Automatic - returned from train method call.

APPENDIX B-continued

API OBJECTS

B.4.3.2 Methods:
- API_RET get_train_result(VerificationFormula** vf);
  Possible returned error codes:
- API_ERR_NOT_IMPLEMENTED
- API_ERR_GENERAL B.4.4 CalibrateRequest
B.4.4.1 Object creation:
Automatic - returned from calibrate method call.
B.4.4.2 Methods:
- API_RET get_calibrate_result(CalibrationFormula** cal_form);
  Possible returned error codes:
- API_ERR_NOT_IMPLEMENTED
- API_ERR_GENERAL B.4.5 AddAudioRequest
B.4.5.1 Object creation:
Automatic - returned from add_phone_call or add_voice_signature methods of VoiceSignature or CalibrationSet objects.
B.4.5.2 Methods:
N/A Note: This class does not include any overloading of methods from the Request base class or any other methods. The class is only needed in order to allow the Request class to be an abstract base class.

B.4.6 GetDataRequest
B.4.6.1 Object creation:
Automatic - returned from get_data methods on VoiceSignature or CalibrationSet objects.
B.4.6.2 Methods:
- API_RET get_data(ABI_BUFFER* buf);
  Possible returned error codes:
- API_ERR_NOT_IMPLEMENTED
- API_ERR_GENERAL B.4.7 GetAudioRequest
B.4.7.1 Object creation:
Automatic - returned from get_audio method on a VoiceSignature object.
B.4.7.2 Methods:
- API_RET get_audio (AudioData** aud_data, API_U_BYTE* phone_call_num);
  Possible returned error codes:
- API_ERR_NOT_IMPLEMENTED
- API_ERR_GENERAL Note: The system allows the calling application to control the process of receiving audio data. A new AudioData object can be pushed to the calling application (notifying the calling application about it using the new_update callback) only after the calling application has already returned the previous new_update callback of the previous AudioData object.

B.5 Other Classes
B.5.1 Scores
B.5.1.1 Object creation:
Automatic - returned from VerifyRequest's Get_Current/Latest_Verification_Result method call.
B.5.1.2 Methods:
- API_RET get_decision(API_U_BYTE decision); // decision may receive one of the values - API_VR_DECISION_ACCEPT, API_VR_DECISION_REJECT, API_VR_DECISION_INCONCLUSIVE
  Possible returned error codes:
- API_ERR_NOT_IMPLEMENTED
- API_ERR_GENERAL
- API_RET get_probability_score(API_U_FLOAT score); // score is a floating point number [0,1]
  Possible returned error codes:
- API_ERR_NOT_IMPLEMENTED
- API_ERR_GENERAL
- API_RET get_params_used(API_DECISION_POLICY* decision_policy, API_UPDATE_POLICY* update_policy, API_U_BYTE length_for_verification);
  Possible returned error codes:
- API_ERR_NOT_IMPLEMENTED
- API_ERR_GENERAL B.5.2 Callback
A callback class' methods to be implemented by the client.
- API_U_BYTE new_update( );
- API_U_BYTE finished( );
- API_U_BYTE abnormal_termination(API_U_WORD2 reason);

Note: Methods with single asynchronous result will cause the speech processing system to first call the new_update method of the Callback object and then its finished method.

B.5.3 Notification
A callback class to be implemented by the client.
B.5.3.1 Methods:
- API_U_BYTE Notify(API_U_BYTE type, API_U_BYTE level, API_STRING message);

B.5.4 Engine

APPENDIX B-continued

API OBJECTS

B.5.4.1 Object creation:
    Abstract base class - objects created by the function:
    API_RET create_sv_engine(API_STRING client_id, Engine** engine);
    Possible returned error codes:
- API_ERR_INVALID_ARGUMENTS
- API_ERR_NOT_ENOUGH_RESOURCES
- API_ERR_NOT_IMPLEMENTED
- API_ERR_GENERAL B.5.4.2 Methods:
    All the object creation functions for all classes (except for: Engine and classes for client implementation) are methods of the Engine object.

Appendix C: PARAMETERS

| Subject/Description | Name | Type | Possible Values | Description |
|---|---|---|---|---|
| C.1 PhoneCall Object Parameters | | | | |
| Addition to voice signature Automatic/User controlled addition of the PhoneCall's audio to a VoiceSignature when verification method fails due to insufficient accumulated VoiceSignature audio. | API_PRM_ADD_VS | API_U_BYTE | API_AUTO | Audio of the call is automatically added to the relevant voice signature stored in the speech processing system's data store. |
| | | | API_MANUAL | Addition of the call's audio to a VoiceSignature must be explicitly performed by the calling application. |
| Addition to calibration Automatic/User controlled addition of the PhoneCall's audio to a CalibrationSet when verification method fails due to insufficient accumulated CalibrationSet audio. | API_PRM_ADD_CALIBRATE | API_U_BYTE | API_AUTO | Audio of the call is automatically added to the preset system's stored calibration set (and group). |
| | | | API_MANUAL | Addition of the call's audio to a CalibrationSet must be explicitly performed by the calling application. |
| Results Update Policy Controls verification results update policy. | API_PRM_UPDATE_POLICY | (void*)API_UPDATE_POLICY* | | Pointer to an API_UPDATE_POLICY structure describing the events that will generate verification updates. For structure description refer to Appendix A. |
| Results Decision Policy Used for setting a decision policy for computing Score object. | API_PRM_DECISION_POLICY | (void*)API_DECISION_POLICY* | | Pointer to an API_DECISION_POLICY structure describing the criteria for acceptance/rejection of claimed speakers. For structure description refer to Appendix A. |
| Audio Length For Verification Used for setting the number of seconds of accumulated audio (from the current audio point backwards) to be used for verification result computation. | API_PRM_LENGTH_FOR_VERIFICATION | API_U_BYTE | | Number of seconds |
| C.2 Engine Object Parameters | | | | |
| Messages Logging Callback Allows the calling application to receive log messages using this callback object. | API_PRM_NOTIFICATION | void* | | A pointer to the notification object. When the parameter is not set or NULL no messages will be sent. |

-continued

Appendix C: PARAMETERS

| Subject/Description | Name | Type | Possible Values | Description |
|---|---|---|---|---|
| C.3 AudioSegment Object Parameters | | | | |
| Audio Start Point Sets ChannelAudioSegment audio retrieving starting point. | API_PRM_ AUDIO_ START_POINT | API_U_BYTE | | The only current supported value is API_ASP_UPON_START (indicating immediate recording initiation). |
| Audio End Point Sets ChannelAudioSegment audio retrieving end point. | API_PRM_ AUDIO_END_ POINT | (void*)API_ AUDIO_END_ POINT | | API_AUDIO_END_POINT structure. For structure description refer to Appendix A. |
| C.4 VoiceSignature Object Parameters | | | | |
| Training Automatic/User controlled VoiceSignature training upon sufficient accumulated audio. | API_PRM_ TRAIN | API_U_BYTE | API_AUTO | Training performed automatically. Verification formula is stored in the speech processing system's data store. |
| | | | API_ MANUAL | Training is performed only upon calling application request (train method). |
| Storage Policy Controls VoiceSignature storing policy. Allows for permanent storage and system defined storage policy. | API_PRM_ STORAGE_ POLICY | API_U_BYTE | API_ DEFAULT | VoiceSignature deletion after x (system parameter) Verification Formula uses. |
| | | | API_ PERMANENT | Permanent storing of VoiceSignature |
| C.5 CalibrationSet Object Parameters | | | | |
| Calibration Automatic/User controlled CalibrationSet calibration upon sufficient accumulated audio. | API_PRM_ CALIBRATE | API_U_BYTE | API_AUTO | Calibration performed automatically. Calibration formula is stored in system's data store. |
| | | | API_ MANUAL | Calibration is performed only upon calling application request (calibrate method). |

Apendix D: ERROR RETURN CODES

| Error Return Code | Meaning/Description |
|---|---|
| API_ERR_INVALID_ARGUMENTS | The supplied arguments contain an illegal value. |
| API_ERR_READ_ONLY | Parameter is defined "read only" and thus cannot be set. |
| API_ERR_OBJECT_LOCKED | Object is locked by another calling application. |
| API_ERR_OBJECT_IN_USE | Object is referenced by another object. |
| API_ERR_OBJECT_ID_ALREADY_EXISTS | An object with an identical ID exists in the data store. |
| API_ERR_OBJECT_NOT_IN_DATA_STORE | An object with the specified ID does not exist in the data store. |
| API_ERR_NOT_CALIBRATED | The specified CalibrationFormula was not trained. |
| API_ERR_AUDIO_TOO_SHORT | Insufficient audio - not enough net audio. |
| API_ERR_FAULTY_AUDIO | Audio is not consistent. |
| API_ERR_NOT_ENOUGH_RESOURCES | The required operation aborted due to one or more required resources allocation failures. |
| API_ERR_NO_AVAILABLE_CALIBRATION | System has not been calibrated. |
| API_ERR_NO_AVAILABLE_TRAINING | The specified VerificationFormula is empty - training results are missing. |
| API_ERR_OPERATION_IN_PROCESS | The specified object's operation is currently in process. |

-continued

Apendix D: ERROR RETURN CODES

| Error Return Code | Meaning/Description |
| --- | --- |
| API_ERR_GENERAL | A general error for undefined error occurred. |
| API_ERR_COMMUNICATION_PROBLEM | Communication problem error |
| API_ERR_NOT_IMPLEMENTED | Method not implemented |
| API_ERR_NO_AVAILABLE_FORMULA | Verification Formula could not be created for verification |
| API_ERR_OBJECT_OVERWRITE_DENIED | Saving cannot be performed object overwrite existing object |

What is claimed is:

1. An application programming interface (API) for enabling a calling application to instruct a speech processing system to perform operations including online audio acquisition and algorithmic speech processing operations, the API comprising:

acquisition interface means for enabling the calling application to instruct the speech processing system to acquire online audio from an external communication channel;

processing interface means for enabling the calling application to instruct the speech processing system to perform at least one of the algorithmic speech processing operations on said acquired audio; and calibration interface means for enabling the calling application to instruct the speech processing system to perform at least one calibration operation.

2. An API according to claim 1, wherein said calibration interface means comprises object-oriented classes.

3. An API according to claim 1, wherein the API further comprises:

at least one parameter, settable by the calling application, which determines whether the calibration operations are performed automatically when there is enough input to the calibration operations.

4. A method of providing an application programming interface (API) for enabling a calling application to instruct a speech processing system to perform operations including online audio acquisition and algorithmic speech processing operations, the method comprising the steps of:

providing acquisition interface means for enabling the calling application to instruct the speech processing system to acquire online audio from an external communication channel; and providing processing interface means for enabling the calling application to instruct the speech processing system to perform at least one of the algorithmic speech processing operations on said acquired audio; and providing calibration interface means for enabling the calling application to instruct the speech processing system to perform at least one calibration operation.

5. A method according to claim 4, wherein said calibration interface means comprises object-oriented classes.

6. A method according to claim 4, wherein the method further comprises the step of:

providing at least one parameter, settable by the calling application, which determines whether the calibration operations are performed automatically when there is enough input to the calibration operations.

\* \* \* \* \*